(12) United States Patent
Lu et al.

(10) Patent No.: US 11,677,591 B2
(45) Date of Patent: Jun. 13, 2023

(54) BIDIRECTIONAL ISOLATED COMMUNICATION CIRCUIT AND METHOD FOR DIFFERENTIAL SIGNAL

(71) Applicant: SAIC MOTOR CORPORATION LIMITED, Shanghai (CN)

(72) Inventors: Kewei Lu, Shanghai (CN); Ji Li, Shanghai (CN); Wendi Chen, Shanghai (CN); Meiai Lin, Shanghai (CN); Yang Li, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 0 days.

(21) Appl. No.: 17/773,763

(22) PCT Filed: May 12, 2020

(86) PCT No.: PCT/CN2020/089878
§ 371 (c)(1),
(2) Date: May 2, 2022

(87) PCT Pub. No.: WO2021/226847
PCT Pub. Date: Nov. 18, 2021

(65) Prior Publication Data
US 2023/0006865 A1    Jan. 5, 2023

(51) Int. Cl.
*H04L 25/02* (2006.01)
*H04L 25/08* (2006.01)

(52) U.S. Cl.
CPC ........ *H04L 25/0272* (2013.01); *H04L 25/085* (2013.01)

(58) Field of Classification Search
CPC .............. H04L 25/026; H04L 25/0264; H04L 25/0272; H04L 25/03828; H04L 25/03834; H04L 25/085
(Continued)

(56) References Cited

U.S. PATENT DOCUMENTS 6,005,440 A * 12/1999 Okamoto ................ H03F 1/086
330/253
2013/0019037 A1    1/2013 Flippin
2014/0028369 A1    1/2014 Fang et al.

FOREIGN PATENT DOCUMENTS

CN    203104693 U    7/2013
CN    104317760 A    1/2015
(Continued)

OTHER PUBLICATIONS

PCT International Search Report and Written Opinion International Application No. PCT/CN/089878; dated Feb. 18, 2021; 9 pages.

*Primary Examiner* — Young T. Tse
(74) *Attorney, Agent, or Firm* — Fenwick & West LLP

(57) ABSTRACT

A bidirectional isolated communication circuit and method for a differential signal. The circuit comprises a first detection circuit used for receiving a first differential pair from a first direction, converting the first differential pair into a first level signal, and inhibiting common-mode interference; a second detection circuit used for receiving a second differential pair from a second direction, converting the second differential pair into a second level signal, and inhibiting common-mode interference; an isolation adjustment circuit used for being provided between the first detection circuit and the second detection circuit and performing communication isolation; and a watchdog circuit used for being awoken according to the first differential pair and/or the second differential pair, and enabling the bidirectional isolated communication circuit to enter from a small current working mode to a normal working mode to perform communication isolation.

11 Claims, 3 Drawing Sheets

(58) Field of Classification Search
USPC ........ 375/224, 257, 286, 346, 349; 370/278, 370/281, 282
See application file for complete search history.

(56) References Cited

FOREIGN PATENT DOCUMENTS

| | | | | |
|---|---|---|---|---|
| CN | 104484306 A | | 4/2015 | |
| CN | 102893567 B | * | 6/2015 | ......... H04L 25/0272 |
| CN | 109976203 A | | 7/2019 | |
| CN | 209070002 U | | 7/2019 | |
| JP | 4484365 B2 | * | 6/2010 | ............. G09G 5/006 |
| WO | WO-2007013052 A1 | * | 2/2007 | ....... G01R 31/31706 |

* cited by examiner

US 11,677,591 B2

BIDIRECTIONAL ISOLATED COMMUNICATION CIRCUIT AND METHOD FOR DIFFERENTIAL SIGNAL

This application is a 35 U.S.C. 371 Patent Application of PCT Application No. PCT/CN2020/089878, titled "BIDIRECTIONAL ISOLATED COMMUNICATION CIRCUIT AND METHOD FOR DIFFERENTIAL SIGNAL," filed on May 12, 2020, which is hereby incorporated by reference in entirety.

FIELD

The present disclosure relates to the technical field of electronic differential communication, and in particular, to a circuit and a method for bidirectional isolated communication of differential signals.

BACKGROUND

In order to achieve a strong anti-interference ability in an electronic differential communication for a vehicle, a controller area network (CAN) bus, a daisy chain, and the like all use differential signals for bidirectional information transmission. In new energy vehicles or other new energy high-voltage energy storage systems, since a battery voltage is as high as 400V or above, communication between electronic control units (ECUs) or communication between partial circuits of different voltage levels in ECUs all require isolation measure to be applied, so as to satisfy requirements on high-voltage safety and communication quality.

There are various devices in the market that can realize isolated communication, such as a magnetic coupling isolation chip or capacitive coupling isolation chip. Such chips, to some extent, are capable of suppressing electromagnetic interference and can achieve single-level signal isolation, but cannot be applied to CAN and daisy chain for differential signal isolation. Low-voltage differential signaling (LVDS) is a high-speed interface commonly used in higher-performance converters and high-bandwidth field-programmable gate array (FPGA) or ASIC I/O. Differential signaling has a strong ability to suppress external electromagnetic interference (EMI). However, input differential amplitudes for such isolation chips are low, generally less than 0.5V, and input voltage range is less than 2.5V. In order to realize high-speed communication, differential amplifiers designed for such chips are implemented with low-swing low-current circuits, which still cannot adapt to the input voltage range of 4.5V to 5V for the CAN and daisy chain. Another common solution for differential signal isolation is to adopt a passive component such as a communication transformer or a high-voltage capacitor. Since a capacitor operates as a short circuit during a hot-plugging process, devices such as a cell management chip are subjected to high electrical stress. In addition, due to an energy limitation and a limited communication distance, such solution is recommended only for in-board communication applications. The communication transformer commonly used for communication isolation between boards cannot be mass-produced automatically due to limited technological level at present, and has a much higher failure rate than other electronic components and affects system functions.

SUMMARY

In view of the above, a circuit and a method for bidirectional isolated communication of differential signals are provided in the present disclosure, in order to overcome defects in conventional techniques.

According to an embodiment of the present disclosure, a circuit for bidirectional isolated communication of differential signals is provided, the circuit including a first detection circuit, a second detection circuit, an isolation adjustment circuit, and a watchdog circuit. The first detection circuit is configured to receive a first differential signal fed from a first direction, convert the first differential signal into a first level signal, and perform common-mode interference suppression. The second detection circuit is configured to receive a second differential signal fed from a second direction, convert the second differential signal into a second level signal, and perform common-mode interference suppression. The isolation adjustment circuit is arranged between the first detection circuit and the second detection circuit to perform communication isolation. The watchdog circuit is configured to be woken up in response to the first differential signal and/or the second differential signal, and then switch the circuit for bidirectional isolated communication from a low current mode to a normal mode to realize communication isolation.

In a specific embodiment of the present disclosure, the isolation adjustment circuit includes a first drive circuit, a second drive circuit, first adjustment circuit, a second adjustment circuit, a third adjustment circuit, a fourth adjustment circuit, a first isolation device, and a second isolation device. The first drive circuit is configured to drive the first detection circuit in response to an input signal from the second direction. The second drive circuit is configured to drive the second detection circuit in response to an input signal from the first direction. The first adjustment circuit is connected to the first detection circuit and is configured to convert the first level signal into a first high-frequency signal. The second adjustment circuit is connected to the second detection circuit and is configured to convert the second level signal into a second high-frequency signal. The third adjustment circuit is connected to the first drive circuit and is configured to convert a third level signal inputted to the first drive circuit into a third high-frequency signal. The fourth adjustment circuit is connected to the second drive circuit and is configured to convert a fourth level signal inputted to the second drive circuit into a fourth high-frequency signal. The first isolation device is connected between the first adjustment circuit and the fourth adjustment circuit. The second isolation device is connected between the second adjustment circuit and the third adjustment circuit.

In a specific embodiment of the present disclosure, the circuit further includes a wake-up circuit configured to be powered in the low current mode and wake up the watchdog circuit.

In a specific embodiment of the present disclosure, the circuit further includes a third isolation device connected between the second differential signal and the wake-up circuit. The third isolation device is configured to wake up the watchdog circuit through the wake-up circuit in response to presence of the first differential signal and/or the second differential signal.

In a specific embodiment of the present disclosure, one or more of the first isolation device, the second isolation device, and the third isolation device are high-voltage isolators.

In a specific embodiment of the present disclosure, the circuit further includes a power supply device. The power supply device is configured to provide normal power supply to the circuit for bidirectional isolated communication when the watchdog circuit is awaked, to realize the normal mode of the circuit for bidirectional isolated communication; and provide low power supply to the circuit for bidirectional isolated communication when the watchdog circuit is not awaked, to realize the low current mode of the circuit for bidirectional isolated communication.

In a specific embodiment of the present disclosure, the power supply device includes a universal-input linear voltage regulator and a low-power-consumption linear voltage regulator. The universal-input linear voltage regulator is configured to provide the normal power supply to the circuit for bidirectional isolated communication to realize the normal mode of the circuit for bidirectional isolated communication. The low-power-consumption linear voltage regulator is configured to provide the low power supply to the circuit for bidirectional isolated communication to realize the low current mode of the circuit for bidirectional isolated communication.

In a specific embodiment of the present disclosure, the power supply device further includes a secondary side circuit module configured to supply power to another bidirectional isolated communication circuit next to the circuit for bidirectional isolated communication circuit.

In a specific embodiment of the present disclosure, the circuit further includes a first resistor and a second resistor. The first resistor is connected between two input terminals of the first detection circuit, and is configured to generate the first differential signal at the two input terminals of the first detection circuit. The second resistor is connected between two input terminals of the second detection circuit, and is configured to generate the second differential signal at the two input terminals of the second detection circuit.

In a specific embodiment of the present disclosure, the first detection circuit and/or the second detection circuit is a two-stage differential amplification circuit including a two-follower circuit, a bias circuit, and an operational amplifier. The two-follower circuit includes a first amplifier and a second amplifier. The operational amplifier is configured to perform a subtraction and output a differential signal.

According to another embodiment of the present disclosure, a method for bidirectional isolated communication of differential signals is provided. The method includes: receiving a first differential signal fed from a first direction, converting the first differential signal into a first level signal, and performing common-mode interference suppression; receiving a second differential signal fed from a second direction, converting the second differential signal into a second level signal, and performing common-mode interference suppression; waking up in response to the first differential signal and/or the second differential signal, and switching from a low current mode to a normal mode to realize communication isolation on input signals.

In the embodiments of the present disclosure, by using the first detection circuit, a first differential signal from a first direction is received and converted into a first level signal, and common-mode interference is suppressed; and by using the second detection circuit, a second differential signal from a second direction is received and converter into a second level signal, and common-mode interference is suppressed. In the embodiments, bidirectional wake-up and bidirectional transmission of communication can be achieved without changing level characteristics, such as frequency and amplitude, of signals at input end and output end.

BRIEF DESCRIPTION OF THE DRAWINGS

Hereinafter, some of the embodiments of the present disclosure are described in detail in an exemplary rather than restrictive manner with reference to accompanying drawings. Same reference numerals in the drawings indicate the same or similar components or parts. Those skilled in the art should understand that the drawings are not necessarily drawn in scale. In the drawings.

DETAILED DESCRIPTION

Figure 1:
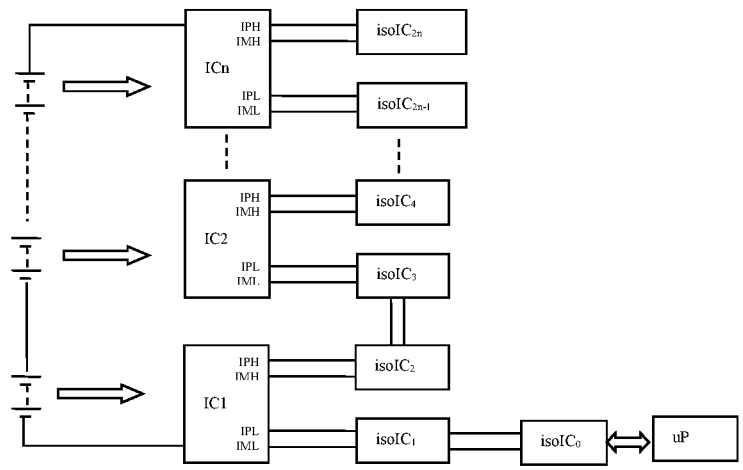
FIG. 1 is a schematic diagram of a general high-voltage cell management system.
Figure 2:
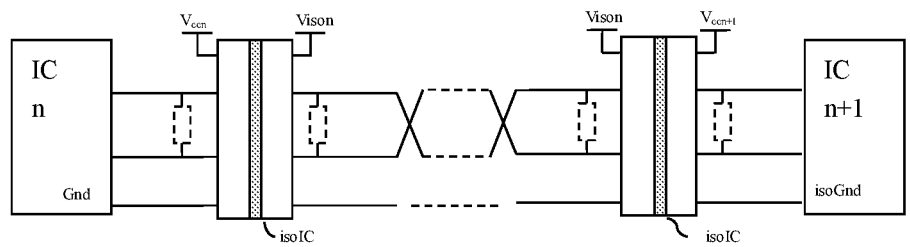
FIG. 2 is a schematic diagram of an isolated communication circuit for a distributed system according to the present disclosure.
Figure 3:
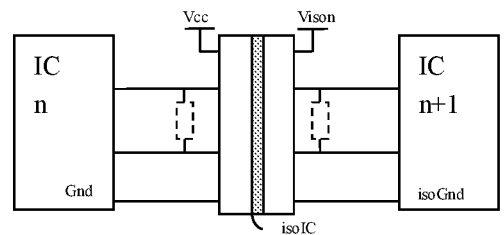
FIG. 3 is a schematic diagram of an application of an on-board level isolated communication.

A general high-voltage battery management system is shown in FIG. 1, which mainly monitors and manages a system in which multiple battery cells are connected in series. ICn represents a cell voltage acquisition chip, and isoICn represents a semiconductor isolation device. Differential signals are transmitted stage by stage through the semiconductor isolation devices isoICn. In a distributed system, such as an application of isolated communication in a distributed system as shown in FIG. 2, two semiconductor isolation devices isoICn are required for inter-board communication in order to ensure a battery compatibility of a single board. For a centralized system, such as an application of on-board level isolated communication as shown in FIG. 3, a single isolation device is required between ICn and ICn+1.

For a system with the application of on-board level isolated communication, an isolation chip may be powered by isolated power supplies on both sides. The isolated communication of a distributed system may be powered by a vehicle battery and an on-board power supply on one side. A board-level power supply may be 5V, which may be provided by an analog front end (AFE) in the battery management system. The vehicle battery is usually a 12V or 24V power supply. A low dropout (LDO) at the side of the isolation chip has a wide voltage range, which is adapted to a power supply of 5V/12V/24V.

Specific implementations of the embodiments of the present disclosure are further described below in conjunction with the accompanying drawings of the embodiments of the present disclosure.

Figure 4:
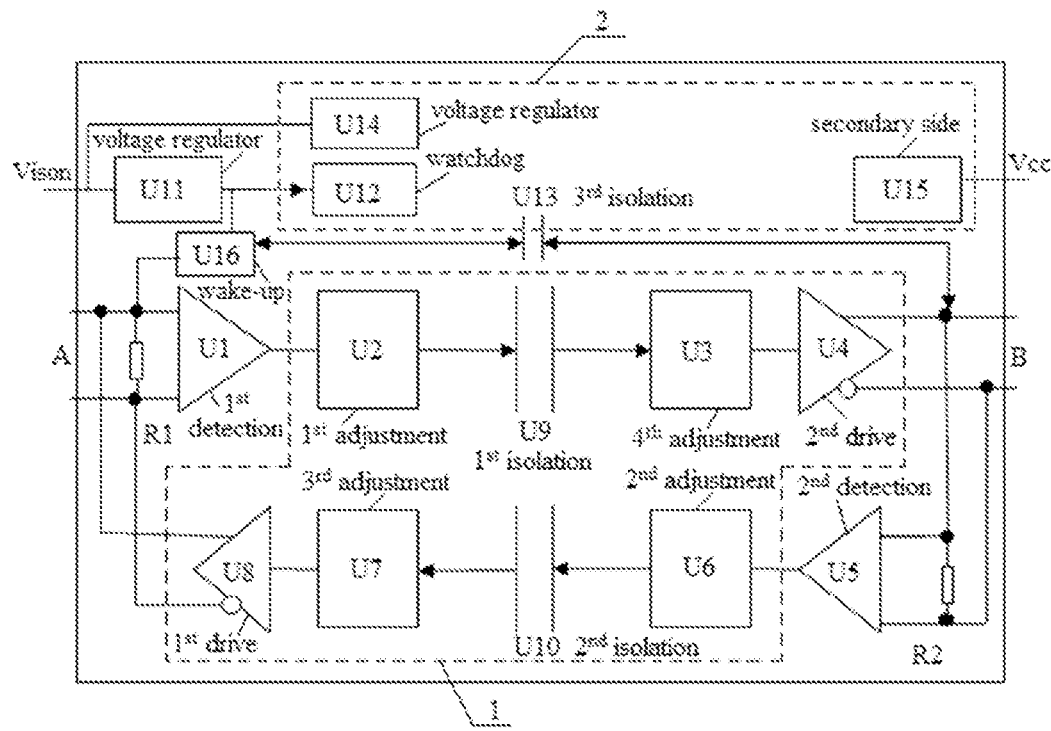
FIG. 4 is a schematic diagram of a circuit for bidirectional isolated communication of differential signals.

A first embodiment of the present disclosure provides a circuit for bidirectional isolated communication of differential signals. As shown in FIG. 4, the circuit includes a first detection circuit U1, a second detection circuit U5, an isolation adjustment circuit 1, and a watchdog circuit U12. The first detection circuit U1 is configured to receive a first differential signal fed from a first direction, convert the first differential signal to a first level signal, and perform common-mode interference suppression. The second detection circuit U5 is configured to receive a second differential signal fed from a second direction, convert the second differential signal to a second level signal, and perform common-mode interference suppression. The isolation adjustment circuit 1 is arranged between the first detection circuit U1 and the second detection circuit U5 to perform communication isolation. The watchdog circuit U12 is configured to be woken up in response to the first differential signal and/or the second differential signal, and then switch the circuit for bidirectional isolated communication from a low current mode to a normal mode to realize communication isolation.

In an embodiment the first direction and the second direction are the input signal directions on both sides defined with the isolation adjustment circuit as the boundary. The first direction is opposite to the second direction. In an embodiment a low current mode is usually as low as uA grade. A normal mode is usually as high as mA grade. The circuit for bidirectional isolated communication works in the low current mode with a current lower than in the normal mode. In the embodiments, bidirectional wake-up and bidirectional transmission of communication can be achieved without changing level characteristics, such as frequency and amplitude, of signals at the input end and output end In a specific implementation of the first embodiment of the present disclosure, the isolation adjustment circuit 1 includes a first drive circuit U8, a second drive circuit U4, first adjustment circuit U2, a second adjustment circuit U6, a third adjustment circuit U7, a fourth adjustment circuit U3, a first isolation device U9, and a second isolation device U10. The first drive circuit U8 is configured to drive the first detection circuit U1 in response to an input signal from the second direction. The second drive circuit U4 is configured to drive the second detection circuit U5 in response to an input signal from the first direction. The first adjustment circuit U2 is connected to the first detection circuit U1 and is configured to convert the first level signal into a first high-frequency signal. The second adjustment circuit U6 is connected to the second detection circuit U5 and is configured to convert the second level signal into a second high-frequency signal. The third adjustment circuit U7 is connected to the first drive circuit U8 and is configured to convert a third level signal inputted to the first drive circuit U8 into a third high-frequency signal. The fourth adjustment circuit U3 is connected to the second drive circuit U4 and is configured to convert a fourth level signal inputted to the second drive circuit U4 into a fourth high-frequency signal. The first isolation device U9 is connected between the first adjustment circuit U2 and the fourth adjustment circuit U3. The second isolation device U10 is connected between the second adjustment circuit U6 and the third adjustment circuit U7.

In the embodiments of the present disclosure, bidirectional wake-up and bidirectional transmission are realized through the drive circuits, the adjustment circuits, and the isolation devices. The drive circuits, the adjustment circuits, the isolation devices, the detection circuits, and the watchdog circuit are all implemented with semiconductor isolation devices. The semiconductor isolation devices are used in the embodiments of the present disclosure, replacing communication transformers or capacitors that need many manual production steps, which significantly reduces circuit failure rate and may significantly improve product yield and product reliability. The semiconductor isolation devices adopted in the embodiments of the present disclosure may prevent surge current from effecting the chip and peripheral devices during hot-plugging process, and significantly improve the product reliability. Compared with the conventional isolation device solution, the present disclosure can realize differential signaling, such as in daisy chain, and can simplify the scheme of system power supply. Semiconductor isolation devices with small size are used in the present disclosure to realize the differential signaling, which is beneficial to miniaturization and thinning of products.

In another specific implementation of the embodiments of the present disclosure, the circuit further includes a wake-up circuit U16, which is configured to be powered in the low current mode and wake up the watchdog circuit U12.

The wake-up circuit U16 in the embodiment of the present disclosure facilitates an accurate execution of the wake-up operation, avoiding failure of isolated communication due to a delayed wake-up operation.

In another specific implementation of the embodiments of the present disclosure, the circuit further includes a third isolation device U13, which is connected between the second differential signal and the wake-up circuit U16, and is configured to wake up the watchdog circuit U12 through the wake-up circuit U16 in response to presence of the first differential signal and/or the second differential signal.

In the embodiment of the present disclosure, the third isolation device U13 isolates the second differential signal from the first differential signal transmitted through the wake-up circuit, which further ensures a bidirectional transmission and isolation effect.

In an embodiment, one or more of the first isolation device U9, the second isolation device U10, and the third isolation device U13 may be high-voltage isolators, or may be capacitive or magnetic isolation circuit modules, which is not limited in the embodiments of the present disclosure.

In another specific implementation of the embodiments of the present disclosure, the circuit further includes a power supply device 2, which is configured to provide normal power supply to the circuit for bidirectional isolated communication when the watchdog circuit is awaked, to realize the normal mode of the circuit for bidirectional isolated communication; and provide low power supply to the circuit for bidirectional isolated communication when the watchdog circuit is not awaked, to realize the low current mode of the circuit for bidirectional isolated communication.

Figure 5:
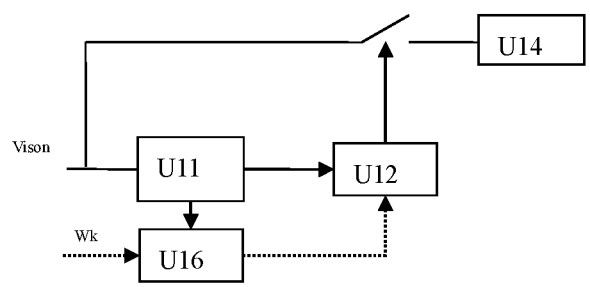
FIG. 5 is a schematic diagram of a power supply in a circuit for bidirectional isolated communication of differential signals on a side of a first direction.

In an embodiment, referring to FIG. 5, the power supply device 2 includes a universal-input linear voltage regulator U14 and a low-power-consumption linear voltage regulator U11.

The universal-input linear voltage regulator U14 is configured to provide the normal power supply to the circuit for bidirectional isolated communication to realize the normal mode of the circuit for bidirectional isolated communication. The low-power-consumption linear voltage regulator U11 is configured to provide the low power supply to the circuit for bidirectional isolated communication to realize the low current mode of the circuit for bidirectional isolated communication.

In an embodiment, in the low-current mode, the low-power-consumption linear voltage regulator U11 charges only the watchdog circuit U12, so that a maximum output current is small, and a low-power-consumption design is easily implemented.

When being woken up through the wake-up circuit U16, the watchdog circuit U12 controls the universal-input linear voltage regulator U14, via a control switch, to provide the normal power supply to the circuit for bidirectional isolated communication to realize the normal mode of the circuit for bidirectional isolated communication. When not being awake, the watchdog circuit U12 controls the low-power-consumption linear voltage regulator U11, via a control switch, to provide the low power supply to the circuit for bidirectional isolated communication to realize the low current mode of the circuit for bidirectional isolated communication.

In an embodiment, the power supply device 2 further includes a secondary side circuit module U15.

The secondary side circuit module U15 is configured to supply power to another bidirectional isolated communication circuit next to the circuit for bidirectional isolated communication circuit.

The power module circuit according to the embodiments of the present disclosure is optimized in architecture as compared to that in the conventional isolation device, and may realize low standby power consumption and bidirectional wake-up.

In an embodiment of the present disclosure, the circuit further includes a first resistor R1, and a second resistor R2.

The first resistor R1 is connected between two input terminals of the first detection circuit, and is configured to generate the first differential signal at the two input terminals of the first detection circuit. The second resistor R2 is connected between two input terminals of the second detection circuit, and is configured to generate the second differential signal at the two input terminals of the second detection circuit.

Figure 6:
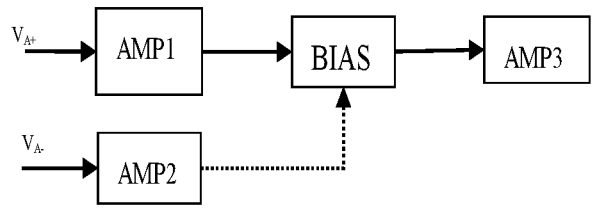
FIG. 6 is a schematic diagram of an architecture of a differential circuit in a detection circuit.

In another specific implementation of the embodiments of the present disclosure, referring to FIG. 6, the first detection circuit and/or the second detection circuit is a two-stage differential amplification circuit including a two-follower circuit, a bias circuit BIAS, and an operational amplifier AMP3. The two-follower circuit includes a first amplifier AMP1 and a second amplifier AMP2. The operational amplifier AMP3 is configured to perform a subtraction operation and output a differential signal to be inputted to a conditioning circuit.

In order to adapt to differential signals of different voltage amplitudes and drive currents, resistors outside the isolation circuit may be connected in series or parallel with resistors R1 and R2 to adjust maximum amplitude of an output voltage, so as to be adapted to different levels and amplitudes from a differential input circuit.

The circuit for bidirectional isolated communication of differential signals is implemented as a semiconductor device in a multi-chip module (MCM) structure. The circuits and isolation devices are prepared separately, then electrically connected through wire bonding, and packaged into a single semiconductor device.

Figure 7:
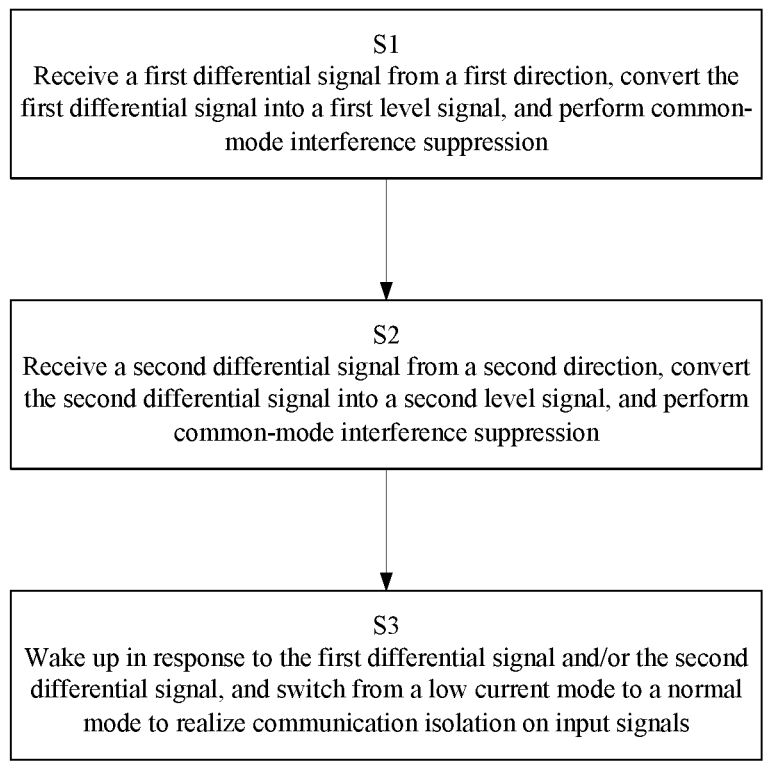
FIG. 7 is a flowchart of a method for bidirectional isolated communication of a distributed system.

Corresponding to the circuit, a method for bidirectional isolated communication of differential signals is provided in the embodiments of the present disclosure. Referring to FIG. 7, the method includes steps S1 to S3.

In S1, a first differential signal fed from a first direction is received and converted into a first level signal, and common-mode interference suppression is performed.

In S2, a second differential signal fed from a second direction is received and converter into a second level signal, and common-mode interference suppression is performed.

In S3, a circuit is woken up in response to the first differential signal and/or the second differential signal, and the circuit is switched from a low current mode to a normal mode to realize communication isolation of input signals.

In the embodiments of the present disclosure, bidirectional wake-up and bidirectional transmission of communication can be achieved without changing level characteristics, such as frequency and amplitude, of signals at the input end and output end.

It should be noted that the embodiments in this specification are described in a progressive manner, each of the embodiments emphasizes the differences between the embodiment and other embodiments, and the same or similar parts among the embodiments may be referred to each other. In particular, device or system embodiments are described briefly as it is basically similar to the method embodiments, and reference may be made to description of the method embodiments. The device and system embodiments described above are merely illustrative, where the units described as separate components may be or may not be physically separate, and the components displayed as units may be or may not be physical units, that is, the components may be centralized or may be distributed to multiple network units. Some or all of the modules may be selected based on actual needs to achieve the objectives of the solutions of the embodiments. Those of ordinary skill in the art may understand and implement the present disclosure without any creative effort.

The above embodiments are only some of the embodiments of the present disclosure, and a scope of the present disclosure is not limited thereto. Modifications or substitutions conceived by those skilled in the art within the technical scope disclosed in this specification fall within the scope of the present disclosure. Therefore, the scope of the present disclosure is defined by the claims.

The invention claimed is:

1. A circuit for bidirectional isolated communication of differential signals, comprising:
   a first detection circuit configured to receive a first differential pair fed from a first direction, convert the first differential pair into a first level signal, and perform common-mode interference suppression;
   a second detection circuit configured to receive a second differential pair fed from a second direction opposite to the first direction, convert the second differential pair into a second level signal, and perform common-mode interference suppression;
   an isolation adjustment circuit arranged between the first detection circuit and the second detection circuit to isolate the second level signal from the first level signal; and
   a watchdog circuit configured to be woken up in response to at least one of the first differential pair and the second differential pair, and then switch the circuit for bidirectional isolated communication from a first mode to a second mode, wherein the circuit for bidirectional isolated communication works in the first mode with a current lower than in the second mode.

2. The circuit according to claim 1, wherein the isolation adjustment circuit comprises:
   a first drive circuit configured to drive the first detection circuit in response to an input signal from the second direction;
   a second drive circuit configured to drive the second detection circuit in response to an input signal from the first direction;
   a first adjustment circuit connected to the first detection circuit, the first adjustment circuit configured to convert the first level signal into a first high-frequency signal;
   a second adjustment circuit connected to the second detection circuit, the second adjustment circuit configured to convert the second level signal into a second high-frequency signal;
   a third adjustment circuit connected to the first drive circuit, the third adjustment circuit configured to convert a third level signal inputted to the first drive circuit into a third high-frequency signal;

a fourth adjustment circuit connected to the second drive circuit, the fourth adjustment circuit configured to convert a fourth level signal inputted to the second drive circuit into a fourth high-frequency signal;

a first isolation device connected between the first adjustment circuit and the fourth adjustment circuit; and a second isolation device connected between the second adjustment circuit and the third adjustment circuit.

3. The circuit according to claim 2, further comprising a wake-up circuit configured to be powered in the first mode and wake up the watchdog circuit.

4. The circuit according to claim 3, further comprising a third isolation device connected between the second differential pair and the wake-up circuit, the third isolation device configured to wake up the watchdog circuit through the wake-up circuit in response to presence of the first differential pair and/or the second differential pair.

5. The circuit according to claim 4, wherein one or more of the first isolation device, the second isolation device, and the third isolation device are high-voltage isolators.

6. The circuit according to claim 5, further comprising a power supply device, wherein the power supply device is configured to:

provide normal a first power supply to the circuit for bidirectional isolated communication when the watchdog circuit is awaked; and provide a second power supply to the circuit for bidirectional isolated communication when the watchdog circuit is not awake, wherein the second power supply is lower than the first power supply.

7. The circuit according to claim 6, wherein the power supply device comprises:

a universal-input linear voltage regulator configured to provide the first power supply to the circuit for bidirectional isolated communication to realize the second mode of the circuit for bidirectional isolated communication; and a low-power-consumption linear voltage regulator configured to provide the second power supply to the circuit for bidirectional isolated communication to realize the first mode of the circuit for bidirectional isolated communication.

8. The circuit according to claim 7, wherein the power supply device further comprises:

a secondary side circuit module configured to supply power to another bidirectional isolated communication circuit next to the circuit for bidirectional isolated communication circuit.

9. The circuit according to claim 8, further comprising:

a first resistor connected between two input terminals of the first detection circuit, and configured to generate the first differential pair at the two input terminals of the first detection circuit; and a second resistor connected between two input terminals of the second detection circuit, and configured to generate the second differential pair at the two input terminals of the second detection circuit.

10. The circuit according to claim 9, wherein at least one of the first detection circuit or the second detection circuit is a two-stage differential amplification circuit comprising a two-follower circuit, a bias circuit, and an operational amplifier, wherein the two-follower circuit comprises a first amplifier and a second amplifier, and the operational amplifier is configured to perform a subtraction and output a differential signal.

11. A method for bidirectional isolated communication of differential signals, comprising:

receiving a first differential pair fed from a first direction, converting the first differential pair into a first level signal, and performing common-mode interference suppression;

receiving a second differential pair fed from a second direction opposite to the first direction, converting the second differential pair into a second level signal, and performing common-mode interference suppression; and waking up a circuit for bidirectional isolated communication, in response to at least one of the first differential pair and the second differential pair, and switching the circuit for bidirectional isolated communication from a first mode to a second mode to isolate the second level signal from the first level signal, wherein the circuit for bidirectional isolated communication works in the first mode with a current lower than in the second mode.

* * * * *